April 5, 1927.
A. J. KERN
CULTIVATOR
Filed Feb. 9, 1922
1,623,120
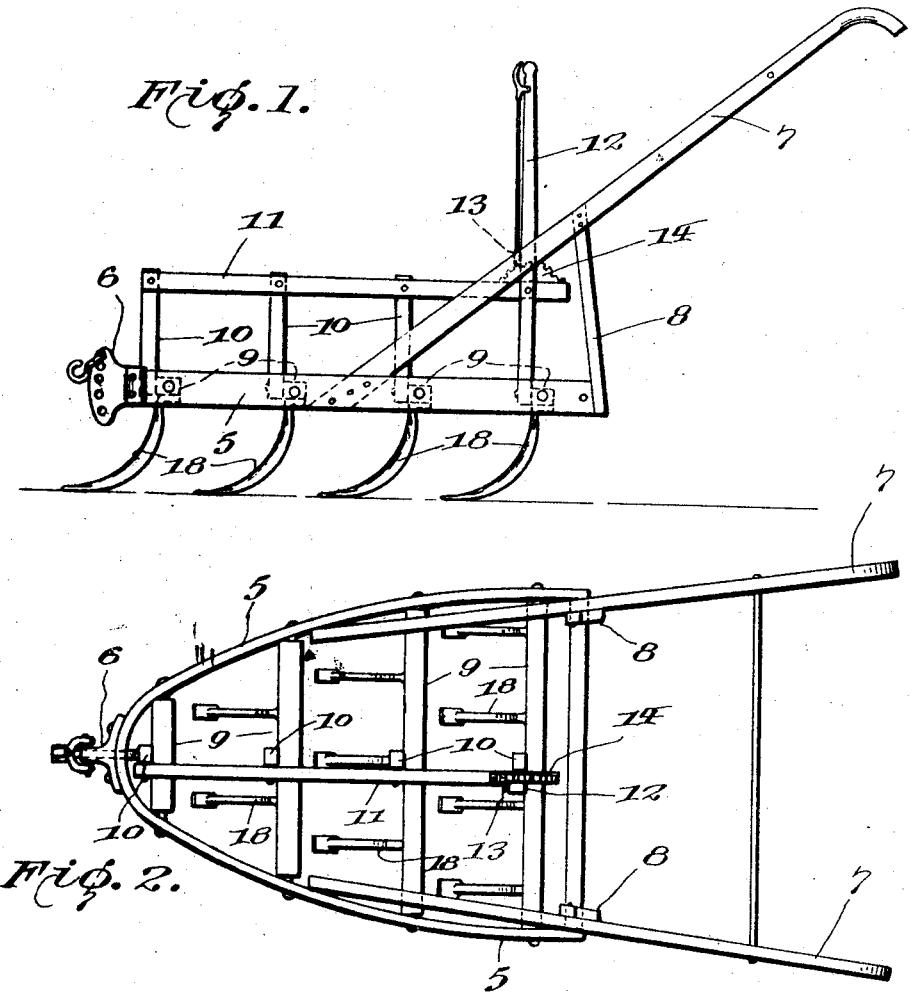
Inventor:
Andrew J. Kern.
Attorneys.

Patented Apr. 5, 1927.

1,623,120

UNITED STATES PATENT OFFICE.

ANDREW JOSEPH KERN, OF PARIS, KENTUCKY.

CULTIVATOR.

Application filed February 9, 1922. Serial No. 535,415.

The implement which is the subject matter of the present application for patent has been designed more particularly for cultivating corn and tobacco plants, and the invention has for its object to provide an implement of this kind embodying certain novel and improved features of construction and modes of operation to be pointed out in detail hereinafter.

In order that the invention may be better understood, reference is had to the accompanying drawing, wherein:

Figure 1 is a side elevation of the implement; Fig. 2 is a plan view thereof.

Referring specifically to the drawing, the frame of the implement is composed of a pair of laterally spaced side bars 5 which converge in the direction of the forward end of the implement and are here fitted with a clevis 6 for attachment of the draft animal. The implement is also provided with rearwardly extending handles 7 whereby it is guided when in operation, the operator walking behind the same. The handles are connected to the side bars, and they are suitably braced, as shown at 8.

Between the side bars 5 extend a number of bars 9 which carry cultivator teeth 18. These bars extend horizontally and they are journaled at their ends in the side bars 5 so that they may be rocked to set the cultivator teeth to work at any depth desired. The bars 9 are connected so that they may all be rocked together, this connection being made by arms 10 connected to the bars midway therebetween, and extending upwardly therefrom, with a link bar 11 connecting the arms at their upper ends. The rearmost bar 9 is fitted with a hand lever 12 provided with a latch 13 adapted to engage a rack 14 on the link bar 11 for locking the cultivator teeth in adjusted position.

In operation, the teeth will be set to enter the ground the desired depth according to the depth of the seed bed.

The side bars 5 run close to the ground, and as they converge forwardly they act as scrapers to force loose fine dirt under the plants without covering the tips of the leaves.

The cultivator is especially designed to be used for cultivating standing tobacco plants and is to be used in light sandy soil. It cannot be used to advantage in sticky or gummy soil such as prairie soil. The cultivator frame is rounded at its forward end and the side bars 5 are curved outwardly along their lengths and therefore the major transverse dimension of the frame at the soil engaging edges of the side bars is at the rear ends of the said bars. This shape and formations permits of the cultivation of the plants practically up to the stalks but does not permit the loose soil to cover up the ends of the drooping leaves. These leaves are lifted by the side bars and there is nothing at the rear of the frame which will catch into the plants or injure or tear the leaves. Therefore the cultivator does not interfere with the standing plants and the frame assists in smoothing the soil after cultivation. The shanks of the teeth are narrow transversely and they do not disturb the surface of the soil but the cultivation is done by the edges of the teeth in the subsurface of the soil. In this manner the top soil is cultivated without damage to the tips of the leaves of the plants and without covering them with soil.

By reference to Figures 1 and 2 of the drawing it will be seen that the rear side of the frame 5 is inclined upwardly and forwardly. When the cultivator is used for smoothing and pulverizing the surface of the soil, the teeth are projected into the soil to such depth that the lower edge of the frame 5 encounters the surface of the soil. Consequently as the upwardly and forwardly inclined rear side of the frame passes over the soil, the surface of the soil is smoothed and pulvereized but the soil is not carried by the rear side of the frame along with the cultivator. This is due to the fact that the said side is inclined as stated and rides over the surface of the soil thus leaving the same in a smooth and pulverized condition.

I claim:

A cultivator comprising a frame consisting of a continuous band and formed substantially wedge-shaped in plan, the side surfaces of the converging sides of the frame being vertically disposed and the side surfaces of the rear side of the frame being inclined upwardly and forwardly, the lower edges of all of the sides of the frame being approximately in the same plane, a series of tooth carrying bars circumscribed by the band, the bars being pivoted at their ends in the sides of the frame, and means for turning the bars.

In testimony whereof I affix my signature.

ANDREW JOSEPH KERN.